US009262321B2

(12) United States Patent
Benhase et al.

(10) Patent No.: US 9,262,321 B2
(45) Date of Patent: Feb. 16, 2016

(54) ADJUSTMENT OF DESTAGE RATE BASED ON READ AND WRITE RESPONSE TIME REQUIREMENTS

(75) Inventors: Michael T. Benhase, Tucson, AZ (US); Lokesh M. Gupta, Tucson, AZ (US); Christopher J. Strauss, Trabuco Canyon, CA (US); Will A. Wright, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 352 days.

(21) Appl. No.: 13/299,048

(22) Filed: Nov. 17, 2011

(65) Prior Publication Data

US 2013/0132667 A1    May 23, 2013

(51) Int. Cl.
G06F 12/08    (2006.01)
G06F 12/12    (2006.01)
G06F 3/06    (2006.01)

(52) U.S. Cl.
CPC .......... *G06F 12/0802* (2013.01); *G06F 3/0611* (2013.01); *G06F 3/0659* (2013.01); *G06F 3/0689* (2013.01); *G06F 12/126* (2013.01)

(58) Field of Classification Search
USPC ................................................. 711/103, 113
See application file for complete search history.

(56) References Cited

U.S. PATENT DOCUMENTS

| | | |
|---|---|---|
| 5,084,791 A | 1/1992 | Thanos et al. |
| 5,542,066 A | 7/1996 | Mattson et al. |
| 5,715,424 A | 2/1998 | Jesionowski et al. |
| 7,191,207 B2 | 3/2007 | Blount et al. |
| 7,539,815 B2 | 5/2009 | Zohar et al. |
| 7,574,556 B2 | 8/2009 | Gill et al. |
| 2004/0078518 A1* | 4/2004 | Kuwata .......................... 711/113 |
| 2008/0168234 A1 | 7/2008 | Gill et al. |
| 2008/0201523 A1 | 8/2008 | Ash et al. |
| 2009/0222621 A1* | 9/2009 | Ash et al. ....................... 711/112 |

(Continued)

FOREIGN PATENT DOCUMENTS

| | | |
|---|---|---|
| JP | 04-215120 | 8/1992 |
| JP | 2000353126 | 12/2000 |
| JP | 2004139349 | 5/2004 |

OTHER PUBLICATIONS

US Application Serial No. Unknown, filed Nov. 17, 2011, entitled "Periodic Destages From Inside and Outside Diameters of Disks to Improve Read Response Times", by inventors Michael T. Benhase, Lokesh M. Gupta, Christohper Strauss, and Will A. Wright.

(Continued)

*Primary Examiner* — Jared Rutz
*Assistant Examiner* — Christopher Do
(74) *Attorney, Agent, or Firm* — Rabindranath Dutta; Konrad Raynes Davda & Victor LLP

(57) ABSTRACT

A storage controller that includes a cache receives a command from a host, wherein a set of criteria corresponding to read and write response times for executing the command have to be satisfied. The storage controller determines ranks of a first type and ranks of a second type corresponding to a plurality of volumes coupled to the storage controller, wherein the command is to be executed with respect to the ranks of the first type. Destage rate corresponding to the ranks of the first type are adjusted to be less than a default destage rate corresponding to the ranks of the second type, wherein the set of criteria corresponding to the read and write response times for executing the command are satisfied.

18 Claims, 8 Drawing Sheets

(56) References Cited

U.S. PATENT DOCUMENTS

2010/0174867 A1 7/2010 Gill et al.
2011/0191534 A1* 8/2011 Ash et al. .................. 711/113

OTHER PUBLICATIONS

PCT International Search Report & Written Opinion dated Jan. 15, 2013 for Application No. PCT/IB2012/056282 filed Nov. 9, 2012.
English translation of JP2004-139349 filed May 13, 2004 by NEC Corporation.
English translation of JP2000-353126 filed 200-12-19 by Misubishi.
U.S. Appl. No. 13/790,460, filed Mar. 8, 2013 by inventors M.T. Benhase, et al.
Preliminary Remarks filed Mar. 8, 2013, pp. 1-2, for U.S. Appl. No. 13/790,460, filed Mar. 8, 2013 by inventors M.T. Benhase, et al.
U.S. Appl. No. 13/842,057, filed Mar. 15, 2013 by Inventors M.T. Benhase, et al.
Office Action dated Sep. 26, 2013, pp. 19, for U.S. Appl. No. 13/790,460, filed Mar. 8, 2013.
Response dated Dec. 23, 2013, pp. 8, to Office Action dated Sep. 24, 2013, pp. 30, for U.S. Appl. No. 13/790,460, filed Mar. 8, 2013.
Response dated Aug. 6, 2015, pp. 9, to Office Action dated May 6, 2015, pp. 30, for U.S. Appl. No. 13/790,460, filed Mar. 8, 2013.
Response to Final Office Action, dated Jul. 2, 2014, for U.S. Appl. No. 13/790,460, filed Mar. 8, 2013, invented by Michael T. Benhase et al., Total 9 pages.
Office Action dated May 6, 2015, for U.S. Appl. No. 13/790,460, filed Mar. 8, 2013, invented by Michael T. Benhase et al., Total 13 pages.
Notice of Allowance dated Oct. 5, 2015, pp. 9, for U.S. Appl. No. 13/790,460, filed Mar. 8, 2013.

* cited by examiner

ADJUSTMENT OF DESTAGE RATE BASED ON READ AND WRITE RESPONSE TIME REQUIREMENTS

BACKGROUND

1. Field

The disclosure relates to a method, system, and article of manufacture for adjustment of destage rate based on read and write response time requirements.

2. Background

A storage controller may control a plurality of storage devices that may include hard disks, tapes, etc. A cache may also be maintained by the storage controller, where the cache may comprise a high speed storage that is accessible more quickly in comparison to certain other storage devices, such as, hard disks, tapes, etc. However, the total amount of storage capacity of the cache may be relatively smaller in comparison to the storage capacity of certain other storage devices, such as, hard disks, etc., that are controlled by the storage controller. The cache may be comprised of one or more of random access memory (RAM), non-volatile storage device (NVS), read cache, write cache, etc., that may interoperate with each other in different ways. The NVS may be comprised of a battery backed-up random access memory and may allow write operations to be performed at a high speed. The storage controller may manage Input/Output (I/O) requests from networked hosts to the plurality of storage devices.

Caching techniques implemented by the storage controller assist in hiding I/O latency. The cache may comprise a high speed memory or storage device used to reduce the effective time required to read data from or write data to a lower speed memory or device. The cache is used for rapid access to data staged from external storage to service read data access requests, and to provide buffering of modified data. Write requests are written to the cache and then written (i.e., destaged) to the external storage devices.

NVS was introduced for allowing fast writes. Generally, in the absence of NVS, data writes may have to be synchronously written (i.e., destaged) directly to the storage device to ensure consistency, correctness, and persistence. Otherwise failure of the server may cause data stored in the cache to be lost. Generally the rate of host writes exceeds the speed of the storage devices, hence without NVS the rate of data transfer to storage devices may be slow. NVS enables fast writes to cache where the writes are mirrored to and stored safely in the NVS until the writes can be transferred to the external storage device. The data is destaged from cache later (and discarded from NVS) in an asynchronous fashion thus hiding the write latency of the storage device. The cache and NVS typically store updates intended for multiple storage devices. To guarantee continued low latency for writes, the data in the NVS may have to be drained so as to ensure that there is always some empty space for incoming writes; otherwise, follow-on writes may become effectively synchronous, which may adversely impact the response time for host writes. On the other hand, if the writes are drained too aggressively, then the benefits of write caching may not be fully exploited since the average amount of NVS cache utilized may be low.

Task Control Block (TCB) is a data structure in the operating system kernel containing the information needed to manage a particular process. Storage controllers may move information to and from storage devices, and to and from the cache (including the NVS) by using TCBs to manage the movement of data. When a write request issues from a host computer to a storage controller, a TCB may be allocated from the operating system code. The TCB is used to maintain information about the write process from beginning to end as data to be written is passed from the host computer through the cache to the secondary storage devices. If the cache is full, the TCB may be queued until existing data in the cache can be destaged (i.e., written to secondary storage devices), in order to free up space. The destage operations may involve the moving of information from cache to a RAID rank and destage TCBs may be allocated for performing the destage operations.

SUMMARY OF THE PREFERRED EMBODIMENTS

Provided are a method, a system, and a computer program product in which a storage controller that includes a cache receives a command from a host, wherein a set of criteria corresponding to read and write response times for executing the command have to be satisfied. The storage controller determines ranks of a first type and ranks of a second type corresponding to a plurality of volumes coupled to the storage controller, wherein the command is to be executed with respect to the ranks of the first type. Destage rate corresponding to the ranks of the first type are adjusted to be less than a default destage rate corresponding to the ranks of the second type, wherein the set of criteria corresponding to the read and write response times for executing the command are satisfied.

In certain embodiments, the adjusted destage rate corresponding to the ranks of the first type allow a rate of I/O operations to the ranks of the first type to be maximized, subject to the read and write response times for executing the command being satisfied. The set of criteria specifies that the average read response time is to be less than a first threshold and a predetermined percentage of reads are to be performed in a time less than a second threshold. The set of criteria further specifies that the average write response time is to be less than a third threshold, each write burst is to be completed in a time that is less than a fourth threshold, and the interval between any two consecutive write bursts is greater than a fifth threshold.

In further embodiments, the adjusted destage rate corresponding to ranks of the second type are determined by simulating execution of a benchmark, wherein the simulating comprises determining whether read peaks are at a lower rate of I/O operations than a rate of I/O operations at which the cache starts to fill and new writes need to wait for destages from the cache to complete. In response to determining that the read peaks are at a lower rate of I/O operations than a rate of I/O operations at which the cache starts to fill and new writes need to wait for destages from the cache to complete, the number of destage task control blocks are decreased to reduce the destage rate. Additionally, in response to determining that the read peaks are not at a lower rate of I/O operations than a rate of I/O operations at which the cache starts to fill and new writes need to wait for destages from the cache to complete, the number of destage task control blocks are increased to increase the destage rate.

In yet further embodiments, determining ranks of the first type is performed by processing a touch file that identifies ranks of the first type or by receiving an indication at the controller that a volume is to be used for a first type of workload and determining from the indication which ranks are of the first type.

In additional embodiments, determining ranks of the first type further comprises processing write burst patterns received at the storage controller to determine whether the write burst patterns conform to a predetermined type. In response to determining that the write burst patterns conform to the predetermined type, a determination is made that ranks to which the write burst patterns are addressed are of the first type.

In further embodiments, the adjusted destage rate corresponding to ranks of the first type is less than half of the default destage rate.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Applications with Strict Requirements of Read and Write Response Times

Certain applications, such as mission critical applications, real-time applications, or some applications in the medical field may have strict requirements on read response times. Such applications may be referred to as stringent requirements applications. For example, in certain applications, 99.99% of read requests may have to be satisfied by the storage controller in less than 600 milliseconds. Certain such applications may have also have workloads that include a sequence of large write bursts. For example, each write burst may be comprised of several hundred megabytes to several gigabytes of small block data and there may be requirements on average write response times, and completion time requirements for each write burst.

If a storage controller sets the destage rate to be too high to accommodate the large write bursts and the completion time requirements for the write bursts, then the storage controller may not be able to respond to read requests quickly enough to satisfy the read response time requirements. By destaging data quickly from the cache via a high destage rate, writes can be speeded up. However, a high rate of destage may cause a slow rate of reads from secondary storage devices as seek times in disks for read operations may increase while writes are being performed, or reads may be queued to be performed after the writes have been performed.

Certain embodiments determine which ranks of secondary storage are used for applications with strict requirements on read response times that also have high write bursts, and adjusts the destage rate to a rate that is lower than a default destage rate. In certain embodiments the storage controller may be able to determine which ranks are to be subjected to such adjusted destage rates that are reduced in comparison to default destage rates. Furthermore, in certain embodiments, an optimization mechanism is used to achieve a high rate of input/output (I/O) operations to the disk, while at the same time satisfying the read and write response time requirements for a stringent requirements application.

Exemplary Embodiments

Figure 1:
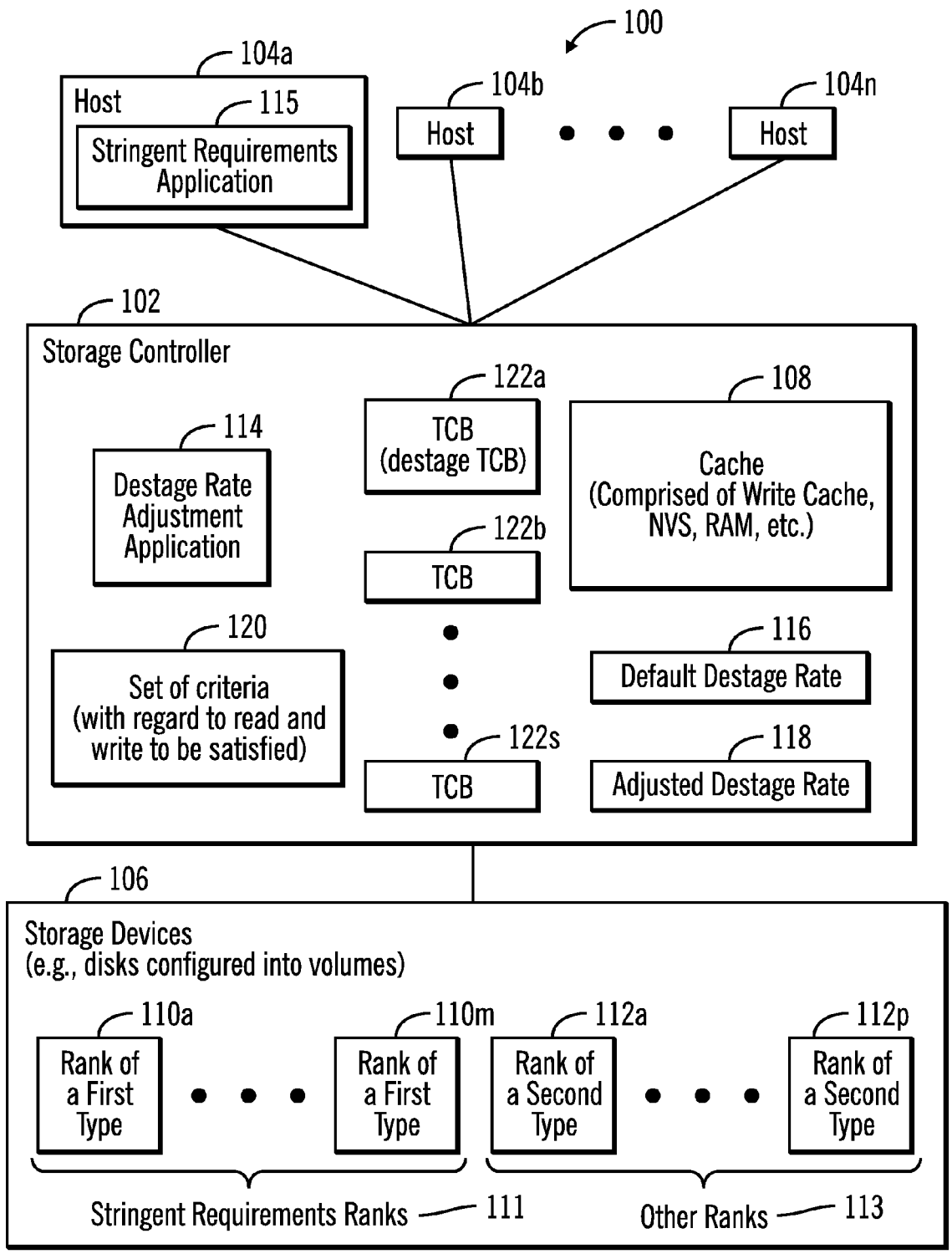
FIG. 1 illustrates a block diagram of a computing environment that includes a storage controller coupled to a plurality of hosts and a plurality of storage devices, in accordance with certain embodiments.

FIG. 1 illustrates a block diagram of a computing environment 100 that includes a storage controller 102 coupled to a plurality of hosts 104a, 104b, . . . 104n, and a plurality of storage devices 106, in accordance with certain embodiments. The plurality of storage devices 106 may be referred to as secondary storage devices, in contrast to a cache 108 that is included in the storage controller 102.

The storage controller 102 and the hosts 104a . . . 104n may comprise any suitable computational device including those presently known in the art, such as, a personal computer, a workstation, a server, a mainframe, a hand held computer, a palm top computer, a telephony device, a network appliance, a blade computer, a server, etc. The storage controller 102, the hosts 104a . . . 104n, and the plurality of storage devices 106 may communicate over a network, such as the Internet, a storage area network, a wide area network, a local area network, etc.

The plurality of storage devices 106 may comprise any suitable storage devices, such as physical hard disks, solid stage disks, etc., known in the art. The storage devices 106 may be configured into volumes. In certain embodiments, storage devices 106 may be disks that are configured as Redundant Array of Independent Disk (RAID) ranks In FIG. 1, a first plurality of ranks of a first type that are used to respond to a first type of application (e.g., applications that have stringent requirements on read and write response times) are shown via reference numerals 110a . . . 110m, and a second plurality of ranks of a second type that are used to respond to other types of applications are shown via reference numerals 112a . . . 112p. The ranks 110a . . . 110m are also referred to as stringent requirements ranks 111, and the ranks 112a . . . 112p are also referred to as other ranks 113.

The cache 108 may comprise one or more of different types of memory, such as RAMs, write caches, read caches, NVS, etc. The different types of memory that comprise the cache may interoperate with each other. Writes from the hosts 104a . . . 104n may initially be written to the cache 108 and then later destaged to the storage devices 106. Read requests from the hosts 104a . . . 104n may be satisfied from the cache 108 if the corresponding information is available in the cache 108, otherwise the information is staged from the storage devices 106 to the cache 108 and then provided to the hosts 104a . . . 104n.

The storage controller 102 executes a destage rate adjustment application 114 that adjusts the number of task control blocks (TCB) per rank to adjust a default destage rate 116 to an adjusted destage rate 118 for certain exemplary applications (e.g., stringent requirements application 115 shown in the exemplary host 104a) for which a set of criteria 120 for read and write response times have to be satisfied. Exemplary TCBs per rank are shown via reference numerals 122a, 122b, . . . 122s.

In certain embodiments, an application with read and write response time requirements may send a command from the host 104a to the storage controller 102. The application with read and write response time requirements may be referred to as the stringent requirements application 115 or a first type of application. The command may comprise a read or a write request or some other command. The destage rate adjustment application 114 determines which ranks are allocated to the stringent requirements application 115 and may determine the ranks of the first type 110a . . . 110m (stringent requirements ranks 111) as being allocated to the stringent requirements application 115. The destage rate adjustment application 114 may have been operating the cache 108 with a default destage rate 116, and to process the commands from the stringent requirements application 115, the destage rate adjustment application 114 may reduce the number of TCBs per rank for each of the ranks 110a . . . 110m, to provide an adjusted destage rate 118 that is lower than the default destage rate 116, where the default destage rate 116 is used for applications that are different from the stringent requirements applications 115. For example, in certain embodiments, the number of TCBs per rank may be halved to make the adjusted destage rate 118 for the stringent requirements application 115 to be half of the default destage rate 116 for other applications.

Figure 2:
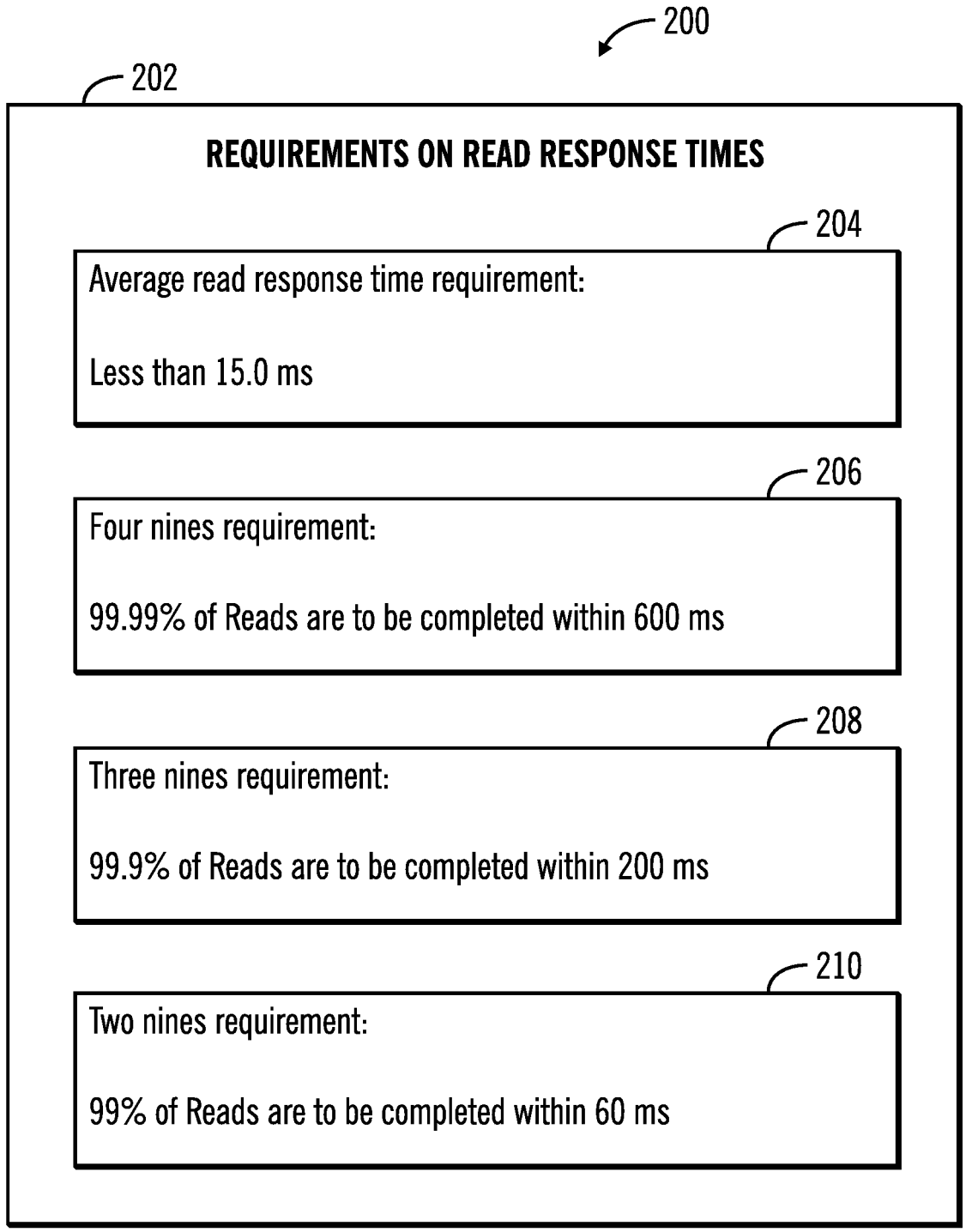
FIG. 2 illustrates a block diagram that shows exemplary requirements on read response times, in accordance with certain embodiments.

FIG. 2 illustrates a block diagram 200 that shows exemplary requirements on read response times 202 for an exemplary stringent requirements applications 115, in accordance with certain embodiments.

In certain embodiments, the exemplary requirements on read response times may be as follows:
1) The average read response time is to be less than 15.0 milliseconds (shown via reference numeral 204);
2) Four nines requirement: 99.99% of reads are to be completed in a time that within 600 milliseconds (shown via reference numeral 206);
3) Three nines requirement: 99.9% of reads are to be completed in a time that is within 200 milliseconds (shown via reference numeral 208); and
4) Two nines requirements: 99% of reads are to be completed in a time that is within 60 milliseconds (shown via reference numeral 210).

Figure 3:
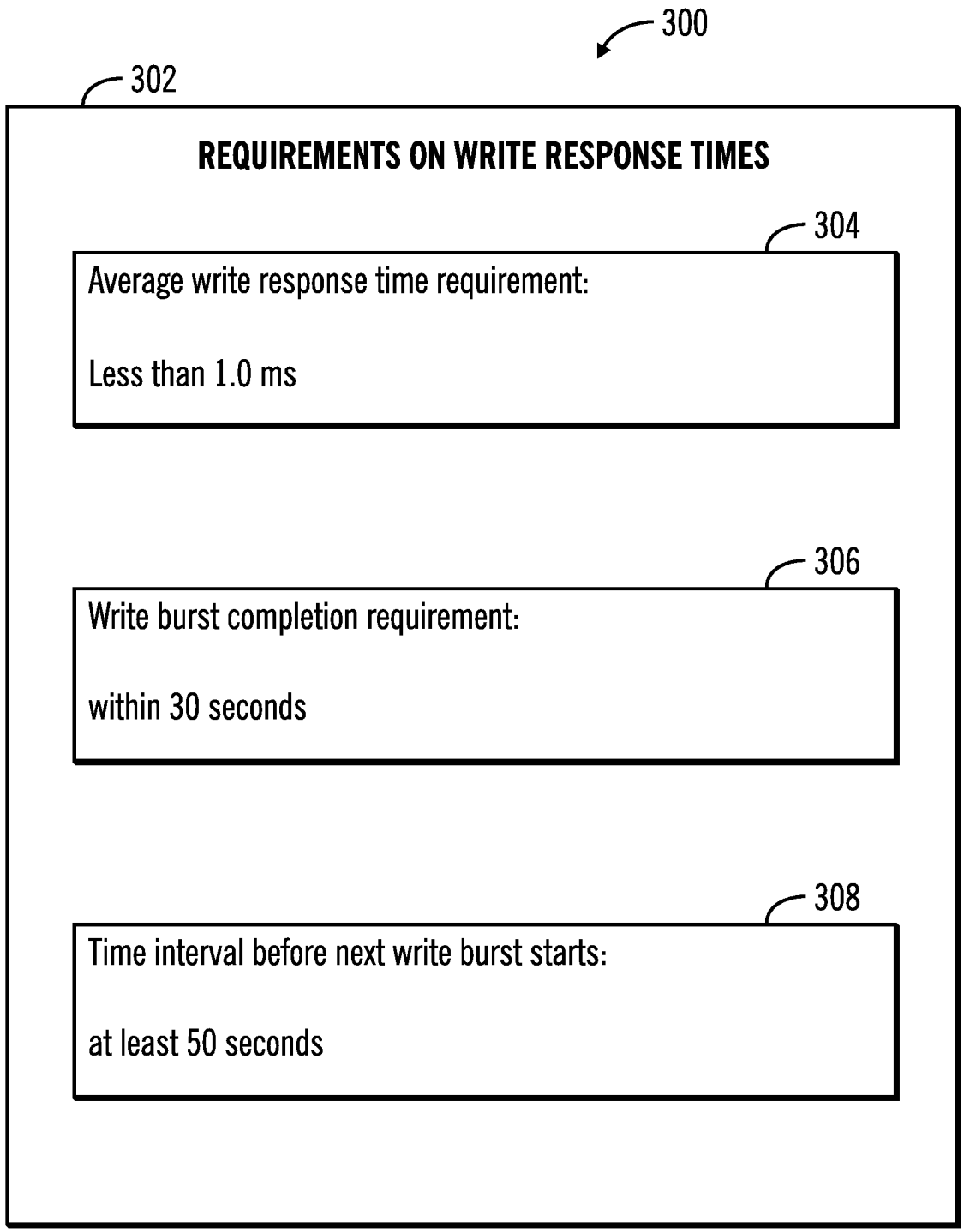
FIG. 3 illustrates a block diagram that shows exemplary requirements on write response times, in accordance with certain embodiments.

In certain embodiments, if the wait time for a read is more than 500 milliseconds, the read is performed even if there are any pending writes. In such embodiments, the four nines requirement may be easy to satisfy, but the three nines requirements and the two nines requirements may be difficult to satisfy if the destage rate is too high, FIG. 3 illustrates a block diagram 300 that shows exemplary requirements on write response times 302 for stringent requirements applications 115, in accordance with certain embodiments.

For certain stringent requirements applications, an exemplary workload includes a large write "burst", which may be comprised of several hundred Mb to 2 Gb of small block data. The data is sent from the hosts 104a . . . 104n to the storage controller 102 as rapidly as possible, utilizing multiple I/O streams. Depending on the size of the NVS in the cache 108, the storage controller destaging applications can become aggressive and highly efficient. While this provides rapid destaging behavior, the storage devices 106 may prioritize the writes in front of pending reads. This is primarily due to the fact that the seek times between the writes are minimized, which in turn provides greater overall Input/Output (I/O) efficiency. The stringent requirements applications require consistently low read response times regardless of whether a write burst event is occurring, (the write burst occur typically every 80 seconds or so and may last for up to 30 seconds). In case no adjustments are made to the default destage rate 116, large read latencies (or I/O read "peak" latencies) may occur soon after the start of the write burst and lasting beyond the end of the write burst. The destage mechanisms may be actively working to empty the NVS cache memory and may cause low read response times.

The stringent requirements application 115 may also recommend disk controller hardware and may prefer hardware with high IOPS (i.e., I/O operations per second) per disk. The configuration objective of the storage controller 102 is to achieve the highest IOPS/disk while satisfying the read response time requirements 202 and the write response time requirements 302.

In certain embodiments, exemplary requirements on write response time 302 are as follows:
1) Average write response time is to be less than 1 millisecond (shown via reference numeral 304);
2) Each write burst completes in less than 30 seconds (shown via reference numeral 304); and
3) Time interval between consecutive write bursts is greater than 50 seconds (shown via reference numeral 304)

Figure 4:
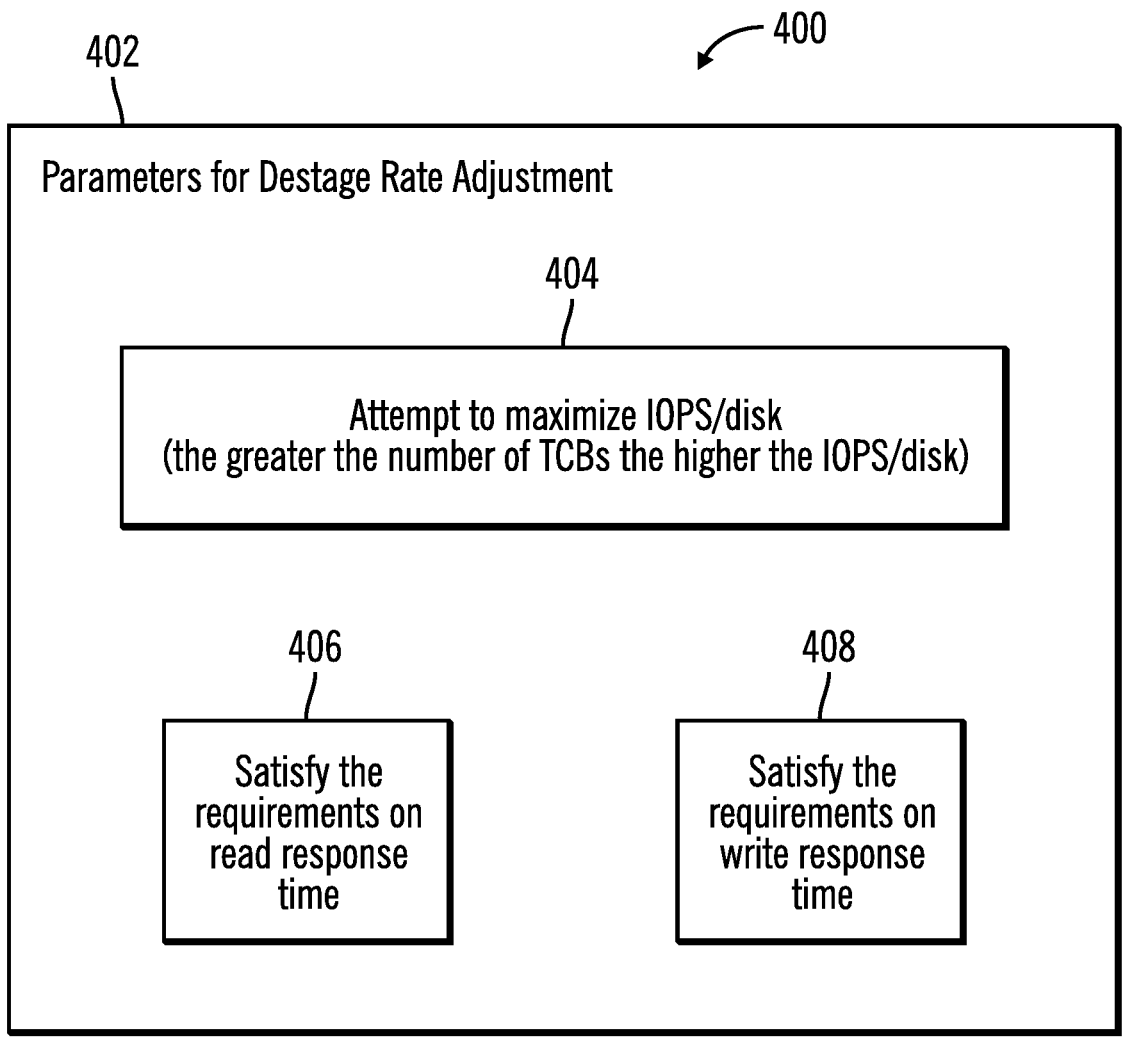
FIG. 4 illustrates a block diagram that shows parameters for destage rate adjustment, in accordance with certain embodiments.

FIG. 4 illustrates a block diagram 400 that shows parameters for destage rate adjustment 402, in accordance with certain embodiments.

In certain embodiments, the number of destages tasks are adjusted such that the storage controller is able to provide the highest possible IOPS/disk without violating the stringent requirements application's requirements for both read and write response times. Ideally the highest IOPS will occur at the point at which both read and write peaks at about the same time.

Therefore, the destage rate adjustment application 114 attempts to adjust the destage rate such that the number of IOPS/disk are maximized 404, while the requirements on the read response time 406 and the requirements of the write response time 408 are both satisfied.

In addition to adjusting the destage rate in order to maximize IOPS/disk while satisfying read and write response time requirements, the storage controller 102 may also allocate certain ranks 110a . . . 110m to be specifically allocated for the stringent requirements application 115.

Figure 5:
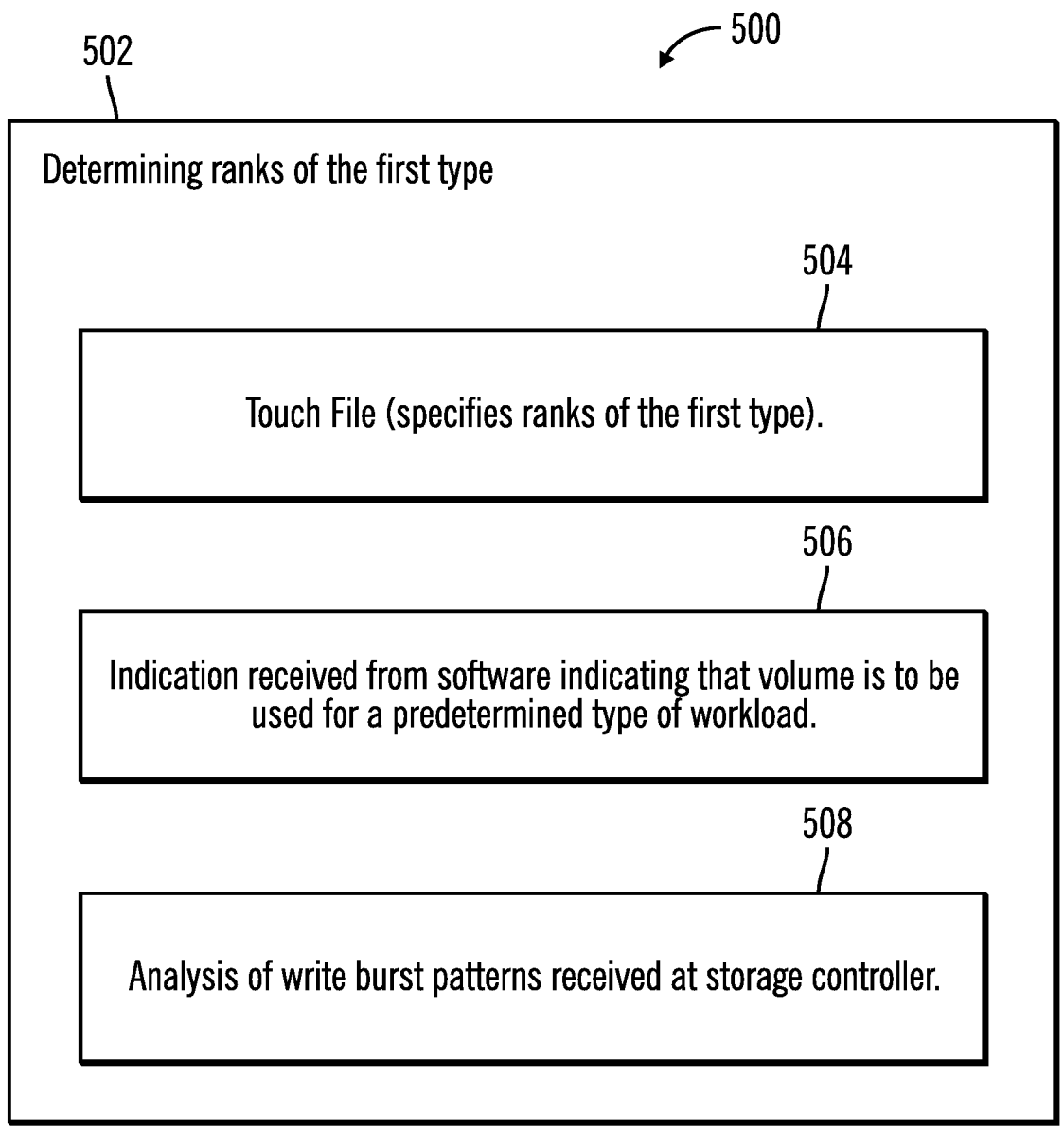
FIG. 5 illustrates a block diagram that how ranks of a predetermined type are determined, in accordance with certain embodiments.

FIG. 5 illustrates a block diagram 500 that how ranks (e.g., ranks 110a . . . 110m) of the stringent requirements type are determined, in accordance with certain embodiments.

There are several ways the storage controller 102 can determine ranks that are for the stringent requirements application 115. In certain embodiments (shown via reference numeral 504) a touch file can identify a rank corresponding to the stringent requirements application 115. The touch file may include a bitmap with bits set for ranks that are to be used for the stringent requirements application 115.

In other embodiments (shown via reference numeral 506) the stringent requirements application 115 can pass an indication in a volume to indicate that the volume is to be used for stringent requirements application workloads. From these volumes, the storage controller 102 can determine which ranks are to be used for the stringent requirements application workload. Then the storage controller 102 can construct a bitmap of ranks to be used for the stringent requirements ranks 111.

In still further embodiments (shown via reference numeral 508) he storage controller 102 determines stringent requirements ranks 111, based on the write burst pattern from the stringent requirements application software. If a rank is getting write bursts for less than 30 seconds and there are no writes for 50 seconds then the rank may be determined to be a stringent requirements application rank. The storage controller 102 then constructs a bitmap of ranks that are used for stringent requirements application workloads.

In certain exemplary embodiments, the maximum number destage TCBs 122a... 122s per rank are set as follows:
1) If the bit is set for the rank to suggest that this is a stringent requirements rank then set the number of maximum destage TCBs allowed for this rank to the most optimal number for the stringent requirements application 115. In certain embodiments the most optimal number is 8; and
2) If the bit is not set to suggest this is not a stringent requirements rank than set the number of maximum destage TCBs allowed for this rank to the default of 40.

Figure 6:
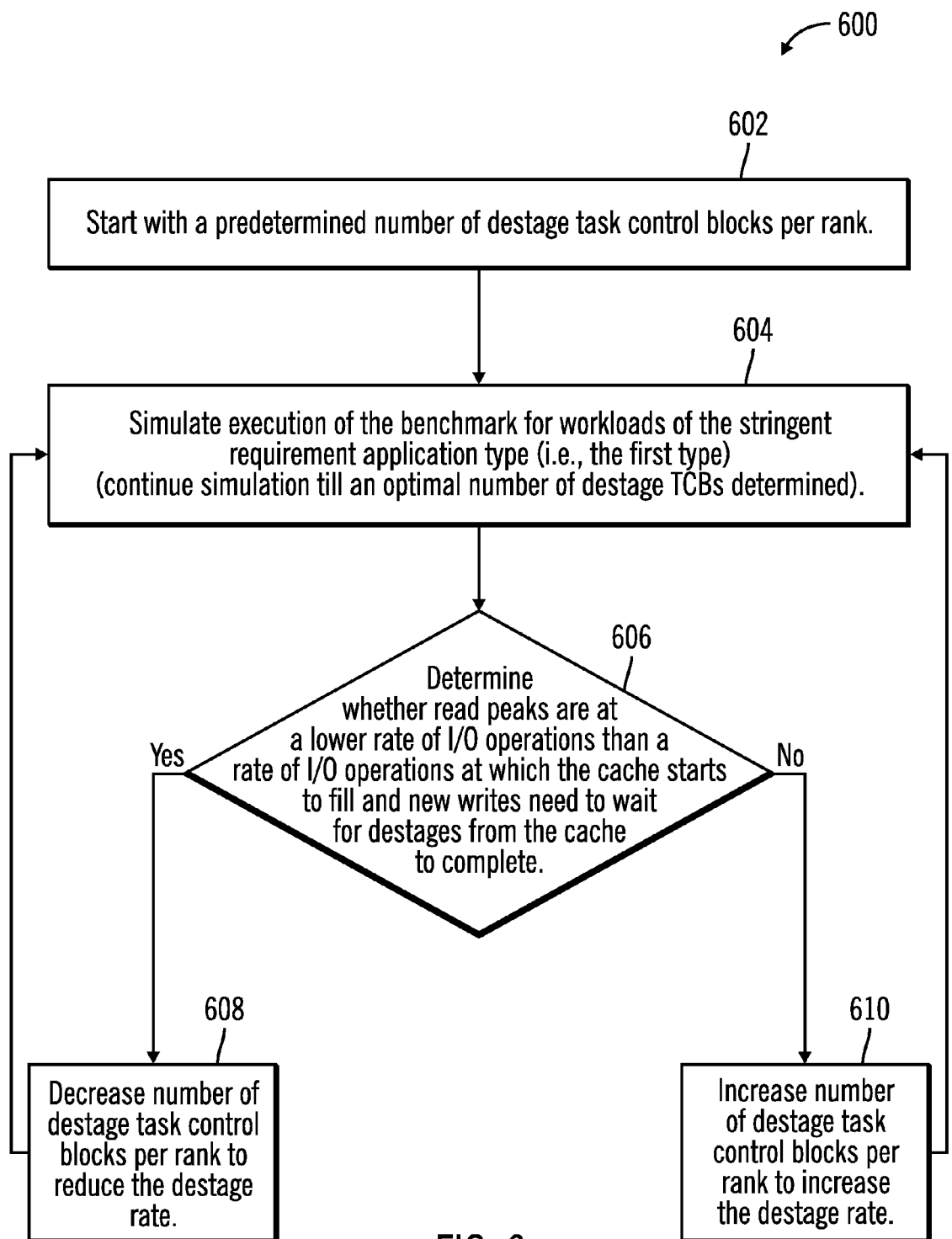
FIG. 6 illustrates a flowchart that shows operations for determining the number of destage task control blocks per rank for destaging data, in accordance with certain embodiments.

FIG. 6 illustrates a flowchart 600 that shows operations for determining the number of destage task control blocks per rank for destaging data, in accordance with certain embodiments. The operations shown in FIG, 6 may be performed by the destage rate adjustment application 114 that executes in the storage controller 102.

Control starts at block 602 in which the destage rate adjustment application 114 starts with a predetermined number of destage task control blocks per rank. Control proceeds to block 604, where the destage rate adjustment application 114 simulates execution of the benchmark for workloads of the stringent requirements application 115, and the simulation is continued until an optimal number of destage TCBs is determined.

From block 604 control proceeds to block 606 in which the destage rate adjustment application 114 determines whether read peaks are at a lower rate of I/O operations than a rate of I/O operations at which the cache starts to fill and new writes need to wait for destages from the cache to complete. In response to determining ("Yes" branch from block 606) that the read peaks are at a lower rate of I/O operations than a rate of I/O operations at which the cache starts to fill and new writes need to wait for destages from the cache to complete, the number of destage task control blocks are decreased (at block 608) to reduce the destage rate. Additionally, in response to determining ("No" branch from block 606) that the read peaks are not at a lower rate of I/O operations than a rate of I/O operations at which the cache starts to fill and new writes need to wait for destages from the cache to complete, the number of destage task control blocks are increased (at block 610) to increase the destage rate.

From blocks 608 and 612 control returns to block 604 and the simulation is continued. The simulation determines the IOPS where read peaks and the writes start filling the cache (e.g., the NVS) and new writes need to wait for destages from the cache (e.g., the NVS) to complete.

In certain embodiments, an exemplary optimal number of destage TCBs where both read peaks and writes peaks are hit at the same time may be found. In certain embodiments simulation may be started with 40 destage TCBs and it may be determined that the optimal destage TCBs per rank for stringent requirements application workloads is 8-10 destage TCBs. As a result of such simulations, the IOPS per disk may be increased from 80 IOPS when the default TCBs per rank of 40 is used, to over 200 IOPS when 8-10 destage TCBs per rank are used.

Figure 7:
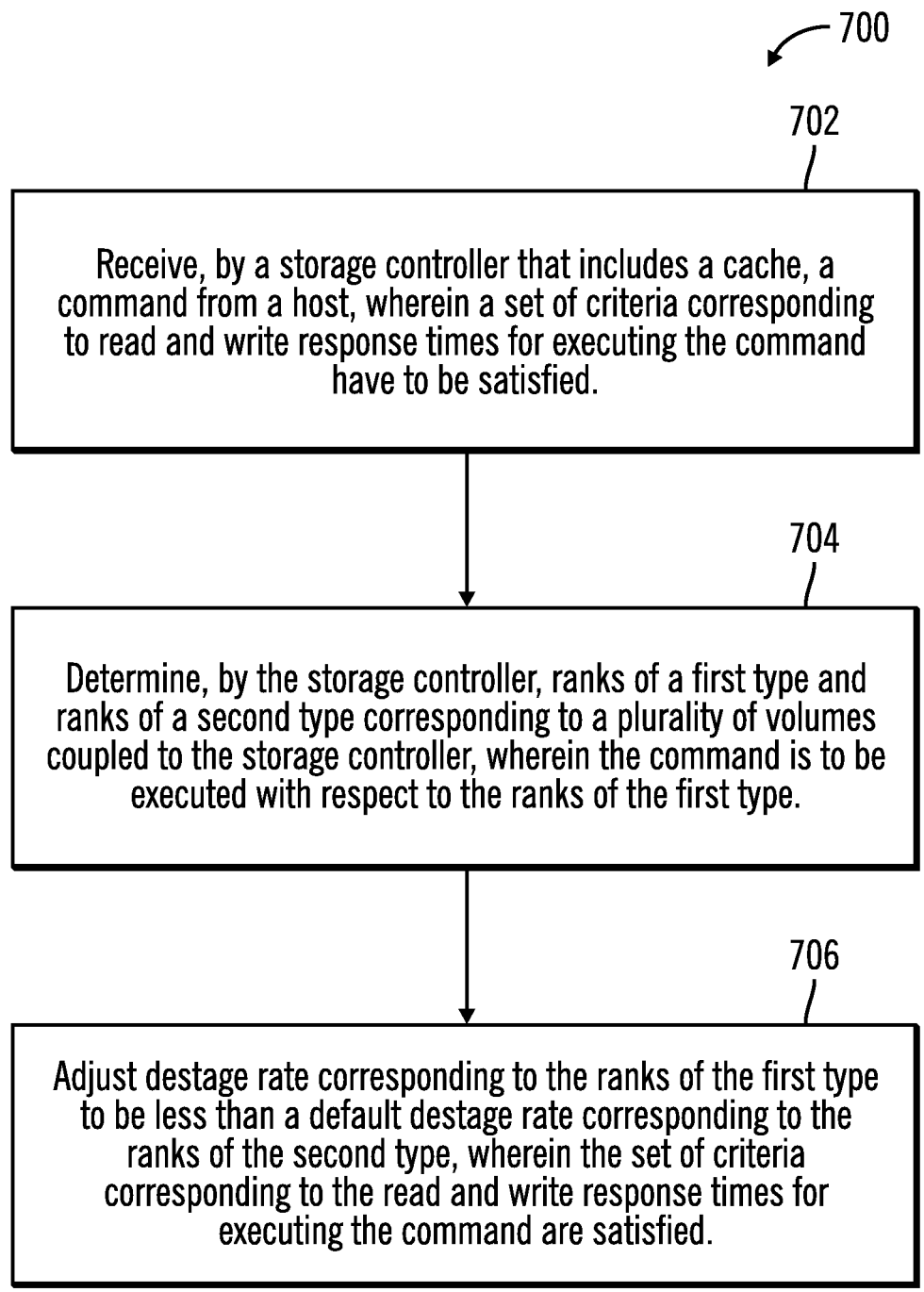
FIG. 7 illustrates a flowchart that shows certain operations for adjusting the destage rate, in accordance with certain embodiments.

FIG. 7 illustrates a flowchart 700 that shows certain operations for adjusting the destage rate, in accordance with certain embodiments. The operations shown in FIG, 7 may be performed by the destage rate adjustment application 114 that executes in the storage controller 102.

Control starts at block 702, in which a storage controller 102 that includes a cache 108 receives a command from a host 104a, wherein a set of criteria 120 corresponding to read 202 and write 302 response times for executing the command have to be satisfied. In certain embodiments the command may be received from the stringent requirements application 115 that executes in the host 104a.

The storage controller 102 determines (at block 704) ranks of a first type 110a... 110m and ranks of a second type 112a... 112p corresponding to a plurality of volumes coupled to the storage controller 102, wherein the command is to be executed with respect to the ranks of the first type 110a... 110m. In certain embodiments, the ranks of the first type 110a... 110m are for the stringent requirements application 115 that executes in the host 104 and from which the command has been received by the storage controller 102.

Control proceeds to block 706 in which destage rate corresponding to the ranks of the first type (i.e., stringent requirement type) are adjusted to be less than a default destage rate 116 corresponding to the ranks of the second type, wherein the set of criteria 120 corresponding to the read and write response times for executing the command are satisfied.

Therefore, FIG. 7 illustrates certain embodiments in which ranks allocated to stringent requirements application and ranks allocated to other applications are identified in the storage controller 102. In certain embodiments, one setting of destage TCBs are used for ranks allocated to the stringent requirements application 115, and another setting is used for other applications. In certain embodiments, the adjusted destage rate corresponding to ranks of the stringent requirements type is less than half of the default destage rate. In certain other embodiments, the adjusted destage rate corresponding to ranks of the stringent requirements type is less than a fifth of the default destage rate.

Therefore, certain embodiments reduce the destage rate in comparison to a default destage rate to allow maximum IOPS while satisfying read and write response time requirements for stringent requirements applications. For applications that are not stringent requirements applications the default destage rate is used.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied there.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list)

of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java*, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

* Java is a trademark or registered trademark of Oracle and/or its affiliates.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 8:
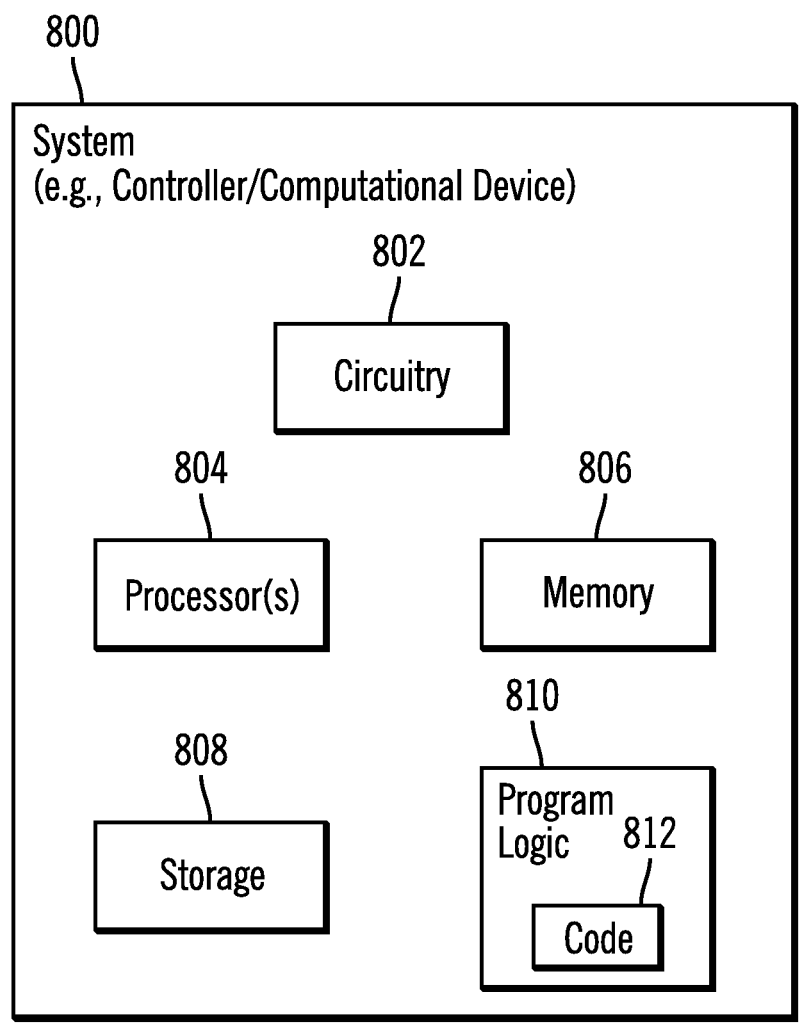
FIG. 8 illustrates a block diagram of a computational system that shows certain elements that may be included in the storage controller of FIG. 1, in accordance with certain embodiments.

FIG. 8 illustrates a block diagram that shows certain elements that may be included in the storage controller 102 or the hosts 104a . . . 104n, in accordance with certain embodiments. The system 800 may comprise the storage controller 102 or the hosts 104a . . . 104n, and may include a circuitry 802 that may in certain embodiments include at least a processor 804. The system 800 may also include a memory 806 (e.g., a volatile memory device), and storage 808. The storage 808 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 808 may comprise an internal storage device, an attached storage device and/or a network accessible storage device. The system 800 may include a program logic 810 including code 812 that may be loaded into the memory 806 and executed by the processor 804 or circuitry 802. In certain embodiments, the program logic 810 including code 812 may be stored in the storage 808. In certain other embodiments, the program logic 810 may be implemented in the circuitry 802. Therefore, while FIG. 8 shows the program logic 810 separately from the other elements, the program logic 810 may be implemented in the memory 806 and/or the circuitry 802.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A system, comprising:
a memory; and
a processor coupled to the memory, wherein the processor performs operations, the operations comprising:
    receiving, by a storage controller that includes a cache, a command from a host, wherein a set of criteria corresponding to read and write response times for executing the command have to be satisfied for a stringent requirements application, and wherein destage task control blocks maintained in the storage controller store information about processes as data to be written is passed from the host through the cache to storage devices coupled to the storage controller; and
    adjusting destage rate corresponding to ranks corresponding to a plurality of volumes stored in the storage devices coupled to the storage controller, wherein the set of criteria corresponding to the read and write response times for executing the command are satisfied, and wherein the adjusted destage rate corresponding to the ranks is determined by simulating execution of a benchmark, and wherein the simulating comprises:
        determining whether read peaks are at a lower rate of input/output (I/O) operations than a rate of I/O operations at which the cache starts to fill and new writes need to wait for destages from the cache to complete; and
        in response to determining that the read peaks are at a lower rate of I/O operations than a rate of I/O operations at which the cache starts to fill and new writes need to wait for destages from the cache to complete, decreasing number of destage task control blocks to reduce the destage rate, wherein:
a destage rate adjustment application determines which ranks are allocated to the stringent requirements application, and wherein a maximum number of destage task control blocks for a rank is set by performing:
    if the rank is a stringent requirements rank then a maximum number of destage task control blocks allowed for the stringent requirements rank is set to a number that is less than a default number; and
    if the rank is not a stringent requirements rank then the maximum number of destage task control blocks allowed for the rank that is not a stringent requirements rank is set to the default number.

2. The system of claim 1, wherein the adjusted destage rate corresponding to the ranks allow a rate of I/O operations to the ranks to be maximized subject to the read and write response times for executing the command being satisfied, and wherein the set of criteria specifies:
    average read response time is to be less than a first threshold;
    a predetermined percentage of reads are to be performed in a time less than a second threshold;
    the average write response time is to be less than a third threshold;
    each write burst is to be completed in a time that is less than a fourth threshold; and
    interval between any two consecutive write bursts is greater than a fifth threshold.

3. The system of claim 1, wherein if the storage controller sets the destage rate to be too high to accommodate the requirements on the average write response times and the completion time requirements for the write bursts of the predetermined type, then the storage controller is unable to respond to read requests quickly enough to satisfy read response time requirements included in the set of criteria.

4. The system of claim 1, the operations further comprising: determining, by the storage controller, ranks of a first type and ranks of a second type corresponding to the plurality of volumes coupled to the storage controller, wherein the ranks of the first type are determined based on an indication received at the storage controller that the volume is to be used for a first type of workload that includes write bursts of a predetermined type, wherein each write burst of the predetermined type is comprised of at least two hundred megabytes of block data, and the set of criteria includes requirements on average write response times and completion time requirements for the write bursts of the predetermined type, and wherein the command is to be executed with respect to the ranks of the first type; and
    adjusting destage rate corresponding to ranks of the first type to be less than half of a default destage rate, and wherein
    in response to determining that the read peaks are not at a lower rate of I/O operations than a rate of I/O operations at which the cache starts to fill and new writes need to wait for destages from the cache to complete, increasing the number of destage task control blocks to increase the destage rate.

5. The system of claim 4, wherein determining ranks of the first type and ranks of the second type further comprises:
processing the write burst patterns received at the storage controller to determine whether the write burst patterns conform to the predetermined type; and
in response to determining that the write burst patterns conform to the predetermined type, determining that ranks to which the write burst patterns are addressed are of the first type.

6. The system of claim 1, wherein the destage task control blocks maintained in the storage controller is a data structure in an operating system kernel that includes information needed to manage a process for destaging.

7. A computer program product, the computer program product comprising:
a computer readable storage medium having computer readable program code embodied therewith, the computer readable program code configured to perform operations, the operations comprising:
receiving, by a storage controller that includes a cache, a command from a host, wherein a set of criteria corresponding to read and write response times for executing the command have to be satisfied for a stringent requirements application, and wherein destage task control blocks maintained in the storage controller store information about processes as data to be written is passed from the host through the cache to storage devices coupled to the storage controller; and
adjusting destage rate corresponding to ranks corresponding to a plurality of volumes stored in the storage devices coupled to the storage controller, wherein the set of criteria corresponding to the read and write response times for executing the command are satisfied, and wherein the adjusted destage rate corresponding to the ranks is determined by simulating execution of a benchmark, and wherein the simulating comprises:
determining whether read peaks are at a lower rate of input/output (I/O) operations than a rate of I/O operations at which the cache starts to fill and new writes need to wait for destages from the cache to complete; and
in response to determining that the read peaks are at a lower rate of I/O operations than a rate of I/O operations at which the cache starts to fill and new writes need to wait for destages from the cache to complete, decreasing number of destage task control blocks to reduce the destage rate, wherein:
a destage rate adjustment application determines which ranks are allocated to the stringent requirements application, and wherein a maximum number of destage task control blocks for a rank is set by performing:
if the rank is a stringent requirements rank then a maximum number of destage task control blocks allowed for the stringent requirements rank is set to a number that is less than a default number; and
if the rank is not a stringent requirements rank then the maximum number of destage task control blocks allowed for the rank that is not a stringent requirements rank is set to the default number.

8. The computer program product of claim 7, wherein the adjusted destage rate corresponding to the ranks allow a rate of I/O operations to the ranks to be maximized subject to the read and write response times for executing the command being satisfied, and wherein the set of criteria specifies:
average read response time is to be less than a first threshold;
a predetermined percentage of reads are to be performed in a time less than a second threshold;
the average write response time is to be less than a third threshold;
each write burst is to be completed in a time that is less than a fourth threshold; and
interval between any two consecutive write bursts is greater than a fifth threshold.

9. The computer program product of claim 8, wherein if the storage controller sets the destage rate to be too high to accommodate the requirements on the average write response times and the completion time requirements for the write bursts of the predetermined type, then the storage controller is unable to respond to read requests quickly enough to satisfy read response time requirements included in the set of criteria.

10. The computer program product of claim 7, the operations further comprising: determining, by the storage controller, ranks of a first type and ranks of a second type corresponding to the plurality of volumes coupled to the storage controller, wherein the ranks of the first type are determined based on an indication received at the storage controller that the volume is to be used for a first type of workload that includes write bursts of a predetermined type, wherein each write burst of the predetermined type is comprised of at least two hundred megabytes of block data, and the set of criteria includes requirements on average write response times and completion time requirements for the write bursts of the predetermined type, and wherein the command is to be executed with respect to the ranks of the first type; and
adjusting destage rate corresponding to ranks of the first type to be less than half of a default destage rate, and wherein
in response to determining that the read peaks are not at a lower rate of I/O operations than a rate of I/O operations at which the cache starts to fill and new writes need to wait for destages from the cache to complete, increasing the number of destage task control blocks to increase the destage rate.

11. The computer program product of claim 10, wherein determining ranks of the first type and ranks of the second type further comprises:
processing the write burst patterns received at the storage controller to determine whether the write burst patterns conform to the predetermined type; and
in response to determining that the write burst patterns conform to the predetermined type, determining that ranks to which the write burst patterns are addressed are of the first type.

12. The computer program product of claim 7, wherein the destage task control blocks maintained in the storage controller is a data structure in an operating system kernel that includes information needed to manage a process for destaging.

13. A storage controller in communication with a host and a plurality of volumes, the storage controller comprising:
a processor; and
a cache coupled to the processor, wherein the storage controller performs:
receiving, a command from a host, wherein a set of criteria corresponding to read and write response times for executing the command have to be satisfied for a stringent requirements application, and wherein destage task control blocks maintained in the storage controller store information about processes as data to be written is passed from the host through the cache to storage devices coupled to the storage controller; and adjusting destage rate corresponding to ranks corresponding to a plurality of volumes stored in the storage devices coupled to the storage controller, wherein the set of criteria corresponding to the read and write response times for executing the command are satisfied, and wherein the adjusted destage rate corresponding to the ranks is determined by simulating execution of a benchmark, and wherein the simulating comprises:

determining whether read peaks are at a lower rate of input/output (I/O) operations than a rate of I/O operations at which the cache starts to fill and new writes need to wait for destages from the cache to complete; and in response to determining that the read peaks are at a lower rate of I/O operations than a rate of I/O operations at which the cache starts to fill and new writes need to wait for destages from the cache to complete, decreasing number of destage task control blocks to reduce the destage rate, wherein:

a destage rate adjustment application determines which ranks are allocated to the stringent requirements application, and wherein a maximum number of destage task control blocks for a rank is set by performing:

if the rank is a stringent requirements rank then a maximum number of destage task control blocks allowed for the stringent requirements rank is set to a number that is less than a default number; and if the rank is not a stringent requirements rank then the maximum number of destage task control blocks allowed for the rank that is not a stringent requirements rank is set to the default number.

14. The storage controller of claim 13, wherein the adjusted destage rate corresponding to the ranks allow a rate of I/O operations to the ranks to be maximized subject to the read and write response times for executing the command being satisfied, and wherein the set of criteria specifies:

average read response time is to be less than a first threshold;

a predetermined percentage of reads are to be performed in a time less than a second threshold;

the average write response time is to be less than a third threshold;

each write burst is to be completed in a time that is less than a fourth threshold; and interval between any two consecutive write bursts is greater than a fifth threshold.

15. The storage controller of claim 13, wherein if the storage controller sets the destage rate to be too high to accommodate the requirements on the average write response times and the completion time requirements for the write bursts of the predetermined type, then the storage controller is unable to respond to read requests quickly enough to satisfy read response time requirements included in the set of criteria.

16. The storage controller of claim 13, wherein the storage controller further performs:

determining ranks of a first type and ranks of a second type corresponding to the plurality of volumes coupled to the storage controller, wherein the ranks of the first type are determined based on an indication received at the storage controller that the volume is to be used for a first type of workload that includes write bursts of a predetermined type, wherein each write burst of the predetermined type is comprised of at least two hundred megabytes of block data, and the set of criteria includes requirements on average write response times and completion time requirements for the write bursts of the predetermined type, and wherein the command is to be executed with respect to the ranks of the first type; and adjusting destage rate corresponding to ranks of the first type to be less than half of a default destage rate, and wherein in response to determining that the read peaks are not at a lower rate of I/O operations than a rate of I/O operations at which the cache starts to fill and new writes need to wait for destages from the cache to complete, increasing the number of destage task control blocks to increase the destage rate.

17. The storage controller of claim 16, wherein determining ranks of the first type and ranks of the second type further comprises:

processing the write burst patterns received at the storage controller to determine whether the write burst patterns conform to the predetermined type; and in response to determining that the write burst patterns conform to the predetermined type, determining that ranks to which the write burst patterns are addressed are of the first type.

18. The storage controller of claim 13, wherein the destage task control blocks maintained in the storage controller is a data structure in an operating system kernel that includes information needed to manage a process for destaging.

* * * * *